(12) United States Patent
Hayashi et al.

(10) Patent No.: US 9,160,999 B2
(45) Date of Patent: Oct. 13, 2015

(54) IMAGE PROCESSING DEVICE AND IMAGING DEVICE

(71) Applicant: FUJIFILM Corporation, Tokyo (JP)

(72) Inventors: Kenkichi Hayashi, Saitama (JP); Kousuke Irie, Saitama (JP); Hidekazu Kurahashi, Saitama (JP); Seiji Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/317,694

(22) Filed: Jun. 27, 2014

(65) Prior Publication Data

US 2014/0307121 A1 Oct. 16, 2014

Related U.S. Application Data

(63) Continuation of application No. PCT/JP2012/083837, filed on Dec. 27, 2012.

(30) Foreign Application Priority Data

Dec. 28, 2011 (JP) ................. 2011-289367

(51) Int. Cl.
*H04N 9/69* (2006.01)
*H04N 9/04* (2006.01)
*H04N 9/73* (2006.01)

(52) U.S. Cl.
CPC ................. *H04N 9/69* (2013.01); *H04N 9/045* (2013.01); *H04N 9/735* (2013.01)

(58) Field of Classification Search
None
See application file for complete search history.

(56) References Cited

U.S. PATENT DOCUMENTS

| 2006/0012808 | A1 | 1/2006 | Mizukura et al. |
| 2006/0017824 | A1* | 1/2006 | Kohashi ........................ 348/241 |
| 2007/0146511 | A1 | 6/2007 | Kinoshita et al. |

(Continued)

FOREIGN PATENT DOCUMENTS

| JP | 8-23543 A | 1/1996 |
| JP | 10-271519 A | 10/1998 |

(Continued)

OTHER PUBLICATIONS

International Search Report, mailed Mar. 12, 2013, issued in PCT/JP2012/083837.

(Continued)

*Primary Examiner* — James Hannett
*Assistant Examiner* — Yih-Sien Kao
(74) *Attorney, Agent, or Firm* — Birch, Stewart, Kolasch & Birch, LLP

(57) ABSTRACT

An image processing method in accordance with one aspect of the present invention includes: preparing a storage unit storing a color mix ratio, which is each of color mix ratios of peripheral pixels adjacent to an object pixel for mixed color correction in a mosaic image including pixels of a plurality of colors, corresponding to each of combinations of first and second parameters indicating an azimuth direction and a color of each of the peripheral pixels, respectively; acquiring color signals of any object pixel and peripheral pixels thereof; reading out a corresponding color mix ratio from the storage unit based on an azimuth direction and a color of each of the peripheral pixels; and eliminating mixed color components included in the object pixel based on the color signals of the object pixel and the peripheral pixels thereof, and the color mix ratio of the peripheral pixels.

3 Claims, 11 Drawing Sheets

(56) References Cited

U.S. PATENT DOCUMENTS

| | | |
|---|---|---|
| 2010/0134660 A1 | 6/2010 | Yamauchi |
| 2010/0157101 A1 | 6/2010 | Yamamoto et al. |
| 2010/0230583 A1* | 9/2010 | Nakata et al. .............. 250/227.2 |
| 2011/0019041 A1* | 1/2011 | Ishiwata et al. ............... 348/280 |
| 2011/0267494 A1 | 11/2011 | Ogawa |
| 2011/0280479 A1 | 11/2011 | Yamada et al. |

FOREIGN PATENT DOCUMENTS

| | | |
|---|---|---|
| JP | 2003-284084 A | 10/2003 |
| JP | 2007-53499 A | 3/2007 |
| JP | 2007-142697 A | 6/2007 |
| JP | 2010-130583 A | 6/2010 |
| JP | 2011-29379 A | 2/2011 |
| JP | 2011-234231 A | 11/2011 |
| RU | 2 338 330 C2 | 11/2008 |
| RU | 2 432 614 C2 | 10/2011 |

OTHER PUBLICATIONS

Written Opinion of the International Searching Authority, mailed Mar. 12, 2013, issued in PCT/JP2012/083837.
Russian Decision on Grant issued in Russian Application No. 2014127286 on Dec. 10, 2014.

* cited by examiner

PIXELS SHARING AMPLIFIER (2×2 PIXELS)

FIG.7

| PARAMETER($P_1 \sim P_3$) | | | COLOR MIX RATIO |
|---|---|---|---|
| AZIMUTH DIRECTION OF PERIPHERAL PIXEL ($P_1$) | COLOR OF PERIPHERAL PIXEL ($P_2$) | POSITION OF OWN PIXEL ($P_3$) | |
| UPPER PIXEL | R | 1 | $A_1$ |
| | | 2 | $A_2$ |
| | | 3 | $A_3$ |
| | | 4 | $A_4$ |
| | G | 1 | $A_5$ |
| | | 2 | $A_6$ |
| | | 3 | $A_7$ |
| | | 4 | $A_8$ |
| | B | 1 | $A_9$ |
| | | 2 | $A_{10}$ |
| | | 3 | $A_{11}$ |
| | | 4 | $A_{12}$ |
| LOWER PIXEL | R | 1~4 | $B_1 \sim B_4$ |
| | G | 1~4 | $B_5 \sim B_8$ |
| | B | 1~4 | $B_9 \sim B_{12}$ |
| LEFT PIXEL | R | 1~4 | $C_1 \sim C_4$ |
| | G | 1~4 | $C_5 \sim C_8$ |
| | B | 1~4 | $C_9 \sim C_{12}$ |
| RIGHT PIXEL | R | 1~4 | $D_1 \sim D_4$ |
| | G | 1~4 | $D_5 \sim D_8$ |
| | B | 1~4 | $D_9 \sim D_{12}$ |

IMAGE PROCESSING DEVICE AND IMAGING DEVICE

CROSS-REFERENCE TO RELATED APPLICATIONS

This application is a Continuation of PCT International Application No. PCT/JP2012/083837 filed on Dec. 27, 2012, which claims priority under 35 U.S.C §119(a) to Japanese Patent Application No. 2011-289367 filed on Dec. 28, 2011. Each of the above application(s) is hereby expressly incorporated by reference, in its entirety, into the present application.

BACKGROUND OF THE INVENTION

1. Field of the Invention

The present invention relates to an image processing device, method and an imaging device, and in particular to a technique of eliminating an influence of a mixed color or the like between each of pixels of a mosaic image corresponding to a color filter array arranged on an imaging element of a single plate.

2. Description of the Related Art

Generally, in an imaging element having a mosaic color filter array, a mixed color is caused by light leaked from an adjacent pixel.

If an image is formed by applying digital signal processing to RGB color signals with many mixed colors, color reproducibility (image quality) is deteriorated. In addition, there is a problem in which it is impossible to accurately calculate a WB gain for white balance (WB) correction from RGB color signals with many mixed colors.

Conventional techniques of eliminating a mixed color component from a color signal including a mixed color component are described in Japanese Patent Application Laid-Open No. 2007-142697 (PTL 1) and Japanese Patent Application Laid-Open No. 2010-130583 (PTL 2).

A signal processor described in PTL 1 is configured to apply mixed color correction processing to a signal of a correction object pixel based on a signal of each of four peripheral pixels adjacent to a correction object pixel in edges by using correction parameters Ka, Kb, Kc, and Kd. It is possible to independently determine each of the four correction parameters Ka, Kb, Kc, and Kd. Accordingly, even if there is directivity in a mixed color caused from peripheral pixels with respect to a pixel of interest, it is configured to enable mixed color correction corresponding to the directivity to be achieved.

An imaging device described in PTL 2 includes a coefficient table in which a correction coefficient related to a signal component mixed to each of pixels from peripheral pixels thereof is stored by being associated with each of positions of the pixels in a pixel array in which a plurality of pixels are arranged in a row direction and a column direction. The imaging device described in PTL 2 reads a corresponding correction coefficient from the coefficient table in accordance with a position of a correction object pixel so as to correct a signal of the correction object pixel by using signals of peripheral pixels thereof and the correction coefficient.

SUMMARY OF THE INVENTION

The invention described in PTL 1 has a feature of a configuration in which it is possible to independently determine each of correction parameters Ka, Kb, Kc, and Kd with respect to each of four peripheral pixels adjacent to a correction object pixel in edges. In the invention, if mixed colors isotropically occur (if there is no directivity), the correction parameters Ka, Kb, Kc and Kd are determined at the same value, and if there is directivity, it is possible to determine the parameters at values corresponding to the direction. The correction parameters Ka, Kb, Kc, and Kd can be controlled from the outside (camera control unit) in real time. In PTL 1, however, there is no description of how to control the correction parameters Ka, Kb, Kc, and Kd with respect to a position of an individual correction object pixel.

The invention described in PTL 2 is configured to provide a coefficient table in which a correction coefficient related to a signal component mixed to each of pixels from peripheral pixels thereof is stored by being associated with each of positions of the pixels on a sensor face, therefore, it is possible to use a proper correction coefficient for each of positions of the pixels on a sensor face. Unfortunately, in the case, there is a problem in which a data amount of the correction coefficients is enormous. PTL 2 describes a relational expression that is stored instead of a coefficient table to reduce a data amount. However, there is a problem in which if change in a correction coefficient on a sensor face does not correspond to a specific relational expression, it is impossible to calculate a proper correction coefficient.

The present invention is made in light of the above-mentioned circumstances, and an object of the present invention is to provide an image processing device, method and an imaging device, capable of minimizing a data amount of color mix ratios to be stored in advance without depending on a type of a mosaic image (color filter array) and favorably performing mixed color correction.

In order to achieve the object, an image processing device in accordance with one aspect of the present invention includes: an image acquisition unit configured to acquire a mosaic image including pixels of a plurality of colors; a storage unit configured to store a color mix ratio caused from each of peripheral pixels adjacent to an object pixel for mixed color correction in the mosaic image, the storage unit storing the color mix ratio corresponding to a combination of a first parameter indicating an azimuth direction of each of the peripheral pixels and a second parameter indicating a colors of the peripheral pixels; a mixed color correction unit configured to eliminate, from a color signal of each of pixels in the mosaic image acquired by the image acquisition unit, mixed color components caused from the peripheral pixels included in the color signal. When the mixed color correction is applied to any object pixel, the mixed color correction unit is configured to perform: acquiring a color signal of the object pixel and color signals of each of peripheral pixels thereof; reading out the corresponding color mix ratio from the storage unit based on azimuth directions and the colors of the peripheral pixels; and eliminating mixed color components included in the object pixel based on the color signal of the object pixel for the mixed color correction, the color signal of each of the peripheral pixels adjacent to the object pixel, and the read-out color mix ratio of each of the peripheral pixels.

According to the one aspect of the present invention, mixed color components caused from the peripheral pixels, which are included in any object pixel, are eliminated based on color signals of a plurality of peripheral pixels adjacent to an object pixel for mixed color correction and influence (color mix ratio) of mixed colors caused by the color signals. The color mix ratio of each of the peripheral pixels is determined depending on an azimuth direction (up-and-down and side-to-side directions, for example) of the peripheral pixel with respect to the object pixel and a color of the peripheral pixel, because the influence of the mixed colors depends on the azimuth directions and the colors of the peripheral pixels. The storage unit stores a color mix ratio corresponding to a combination of a first parameter indicating the azimuth directions of the peripheral pixels and a second parameter indicating the colors of the peripheral pixels. When mixed color correction is applied to any object pixel, it is configured to read out the corresponding color mix ratio form the storage unit for each of peripheral pixels of the object pixel based on the azimuth directions and the colors of the peripheral pixels.

The storage unit is configured to store color mix ratios only as many as the number of combinations of the number of the azimuth directions of the peripheral pixels and the number of colors of the peripheral pixels regardless of a type of a mosaic image (color filter array), whereby it is possible to minimize a data amount of the color mix ratio to be stored in advance.

In an image processing device in accordance with another aspect of the present invention, it is preferable that the mosaic image includes a pixel group of a basic array pattern composed of M×N ("M" and "N" are integers of 2 or more, at least one of the integers is 3 or more) pixels, and that the pixel group of the basic array pattern is repeatedly arranged in a horizontal direction and a vertical direction.

As described above, since the color mix ratio to be stored in the storage unit in advance does not depend on a type of the mosaic image, a large effect of reducing an amount of color mix ratios can be obtained, as a pixel size of a basic array pattern of a mosaic image becomes large and the mosaic image becomes complex.

In an image processing device in accordance with yet another aspect of the present invention, the mixed color correction unit includes a parameter acquisition unit configured to acquire the first parameter and the second parameter of each of the peripheral pixels corresponding to any object pixel based on a position of the object pixel in the mosaic image, and the mixed color correction unit is configured to read out the corresponding color mix ratio from the storage unit based on the acquired first parameter and the acquired second parameter, that is, if a position of an object pixel is specified, first and second parameters related to peripheral pixels of the object pixel can be acquired, whereby it is possible to read out the color mix ratio corresponding to the first parameter and the second parameter from the storage unit.

In an image processing device in accordance with yet another aspect of the present invention, the mosaic image is outputted from an imaging element having an element structure in which an amplifier is shared for each predetermined pixel group. When a third parameter is positional information showing the position of the object pixel for the mixed color correction in the pixel group sharing the amplifier, the storage unit stores a color mix ratio corresponding to a combination of the first parameter, the second parameter, and the third parameter. The parameter acquisition unit acquires the first parameter, the second parameter, and the third parameter for each of peripheral pixels based on the position of any object pixel in the mosaic image. The mixed color correction unit reads out the corresponding color mix ratio for each of the peripheral pixels from the storage unit based on the acquired first parameter, the acquired second parameter, and the acquired third parameter.

In an imaging element having an element structure in which an amplifier is shared for each predetermined pixel group, a difference in an output characteristic occurs according to a position relation between the amplifier and each of the pixels. The storage unit stores a color mix ratio in consideration of the difference. That is, the storage unit stores a color mix ratio corresponding to a combination of first, second, and third parameters, in which a third parameter serves as positional information showing a position (own pixel position) of an object pixel in a pixel group sharing an amplifier. The mixed color correction unit reads out a corresponding color mix ratio from the storage unit for each of peripheral pixels of the object pixel based on first, second, and third parameters acquired related to the object pixel in order to apply the color mix ratio to mixed color correction for the object pixel.

In an image processing device in accordance with yet another aspect of the present invention, it is preferable that when the whole region of the mosaic image is divided into a plurality of divisions, the storage unit stores a color mix ratio for each of the divisions, and the mixed color correction unit reads out the corresponding color mix ratio from the storage unit depending on a division in the plurality of divisions, in which a position of the object pixel is included. Incident angles of subject light with respect to each of pixels of an imaging element at a central portion and at a peripheral portion of the mosaic image are different, so that a color mix ratio of each of the portions is different. Therefore, it is configured to divide the whole region of the mosaic image into a plurality of divisions so that a color mix ratio can be changed for each of the divisions.

In an image processing device in accordance with yet another aspect of the present invention, the mixed color correction unit is configured to apply product-sum calculation to a color signal of each of peripheral pixels adjacent to the object pixel for the mixed color correction and the color mix ratio determined for each of positions of the peripheral pixels, the color mix ratio being read out from the storage unit, to calculate a mixed color component so that the calculated mixed color component is subtracted from the color signal of the object pixel.

In the image processing device in accordance with the yet another aspect of the present invention, it is preferable to further include: a white balance gain calculation unit configured to calculate a white balance gain based on a color signal of each of pixels in the mosaic image, from which a mixed color component is eliminated by the mixed color correction unit; and a white balance correction unit configured to apply white balance correction to a color signal of each of pixels in the mosaic image, from which a mixed color component is eliminated by the mixed color correction unit, based on the white balance gain calculated by the white balance gain calculation unit. Since it is configured to calculate a WB gain for white balance (WB) correction based on the mosaic image after the mixed color correction, it is possible to calculate a proper WB gain in which influence of a mixed color and the like is eliminated. Accordingly, it is possible to favorably perform the white balance correction.

An image processing method in accordance with yet another aspect of the present invention includes: an image acquisition step of acquiring a mosaic image including pixels of a plurality of colors; a step of preparing storage unit configured to store a color mix ratio caused from each of peripheral pixels adjacent to an object pixel for mixed color correction in the mosaic image, the storage unit storing the color mix ratio corresponding to a combination of a first parameter indicating azimuth directions of the peripheral pixels and a second parameter indicating colors of the peripheral pixels; and a mixed color elimination step of eliminating, from a color signal of each of pixels in the mosaic image acquired by the image acquisition step, mixed color components that are caused from the peripheral pixels, and are included in the color signal. In the mixed color elimination step, when mixed color correction is applied to any object pixel, a color signal of the object pixel and color signals of peripheral pixels thereof are acquired, the corresponding color mix ratio are read out from the storage unit based on the azimuth directions and the colors of the peripheral pixels, and mixed color components included in the object pixel are eliminated based on the color signal of the object pixel for the mixed color correction, the color signal of each of the peripheral pixels adjacent to the object pixel, and the read-out color mix ratio of each of the peripheral pixels.

An imaging device in accordance with yet another aspect of the present invention includes: an imaging unit having a photographic optical system, and an imaging element on which a subject image is formed through the photographic optical system; an image acquisition unit configured to acquire a mosaic image outputted from the imaging unit; and the image processing device described above.

In an imaging device in accordance with the yet another aspect of the present invention, it is preferable that an imaging element is configured such that a color filter with a predetermined color filter array is arranged on a plurality of pixels composed of photoelectric conversion elements arranged in a horizontal direction and a vertical direction, the color filter array includes a predetermined basic array pattern in which there are arranged a first filter corresponding to a first color consisting of one or more colors, and a second filter corresponding to a second color consisting of two or more colors, the second color having a contribution rate for acquiring a luminance signal, the contribution rate being lower than that of the first color, and in which the basic array pattern is repeatedly arranged in the horizontal direction and the vertical direction, and the basic array pattern is an array pattern corresponding to M×N ("M" and "N" are integers of 2 or more, at least one of the integers is 3 or more) pixels. Although the mosaic image outputted from an imaging element having the color filter array described above has a complex combination of colors, there is no problem even if a pixel size of the basic array pattern is large, because color mix ratios to be stored in the storage unit in advance do not depend on a type of a mosaic image.

In the imaging device in accordance with the yet another aspect of the present invention, it is preferable that one or more of the first filters are arranged in each of lines in the horizontal direction, the vertical direction, an oblique upper right direction, and an oblique lower right direction in the color filter array, one or more of the second filters corresponding to each of colors of the second color are arranged in each of lines in the horizontal direction and the vertical direction in the color filter array in the basic array pattern, and a ratio of a pixel number of the first color corresponding to the first filter is larger than a ratio of a pixel number of each color of the second color corresponding to the second filter.

In the imaging element above, the color filter array is formed so that the first filter corresponding to the first color most contributing to acquisition of a luminance signal is arranged in each of lines in horizontal, vertical, oblique upper right, and oblique lower right directions in the color filter array, therefore, it is possible to improve reproducibility of synchronization processing in a high frequency region. In addition, the second filter corresponding to the second color consisting of two or more colors other than the first color is configured so that one or more of the second filters are arranged in each of lines in the horizontal and vertical directions in the color filter array in the basic array pattern, therefore, it is possible to reduce occurrence of a color moire (false color) to achieve high resolution. In the color filter array, since the predetermined basic array pattern is repeatedly arranged in the horizontal and vertical directions, it is possible to perform synchronization processing in accordance with a repeated pattern when the synchronization processing is performed at a subsequent stage. Further, a ratio of a pixel number of the first color corresponding to the first filter to a pixel number of the second color corresponding to the second filter is changed so that especially a ratio of the pixel number of the first color most contributing to acquisition of a luminance signal is made larger than a ratio of a pixel number of each of colors of the second color corresponding to the second filter, whereby it is possible to prevent aliasing as well as to achieve excellent reproducibility in a high frequency.

In the imaging device in accordance with the yet another aspect of the present invention, it is preferable to the basic array pattern is a square array pattern corresponding to 3×3 pixels, and that the first filter is arranged at a center and four corners.

In the imaging device in accordance with the yet another aspect of the present invention, it is preferable that the first color is green (G), and the second colors are red (R) and blue (B), the predetermined basic array pattern is a square array pattern corresponding to 6×6 pixels, and the filter array includes: a first array corresponding to 3×3 pixels, the first array including G-filters arranged at a center and four corners thereof, B-filters arranged up and down across a G-filter arranged at the center, and R-filters arranged right and left across the G-filter arranged at the center; and a second array corresponding to 3×3 pixels, the second array including G-filters arranged at a center and four corners thereof, R-filters arranged up and down across a G-filter arranged at the center, and B-filters arranged right and left across the G-filter arranged at the center; the first array and the second array being alternately arranged in the horizontal direction and the vertical direction.

In the imaging device in accordance with the yet another aspect of the present invention, it is preferable that the imaging element has an element structure in which an amplifier is shared for each predetermined pixel group, and the predetermined pixel group has a size of K×L (K≤M, L≤N, K and L are natural numbers) pixels.

According to the present invention, it is configured to store a color mix ratio corresponding to a combination of a plurality of parameters affecting the size of a mixed color component included in a color signal of an object pixel for mixed color correction in the storage unit in advance so that when mixed color correction is applied to any object pixel, a color mix ratio of each of peripheral pixels adjacent to the object pixel is read out from the storage unit to be applied to the mixed color correction. Accordingly, it is possible to minimize a data amount of color mix ratios to be stored in advance without depending on a type of a mosaic image (color filter array) to enable excellent mixed color correction.

BRIEF DESCRIPTION OF THE DRAWINGS

FIG. 7 is a chart illustrating an example of a correction table that shows color mix ratios;

DETAILED DESCRIPTION OF EXEMPLARY EMBODIMENTS

Referring to accompanying drawings, embodiments of the image processing device and method, and the imaging device, in accordance with the present invention, will be described in detail.

[Embodiments of the Imaging Device]

Figure 1:
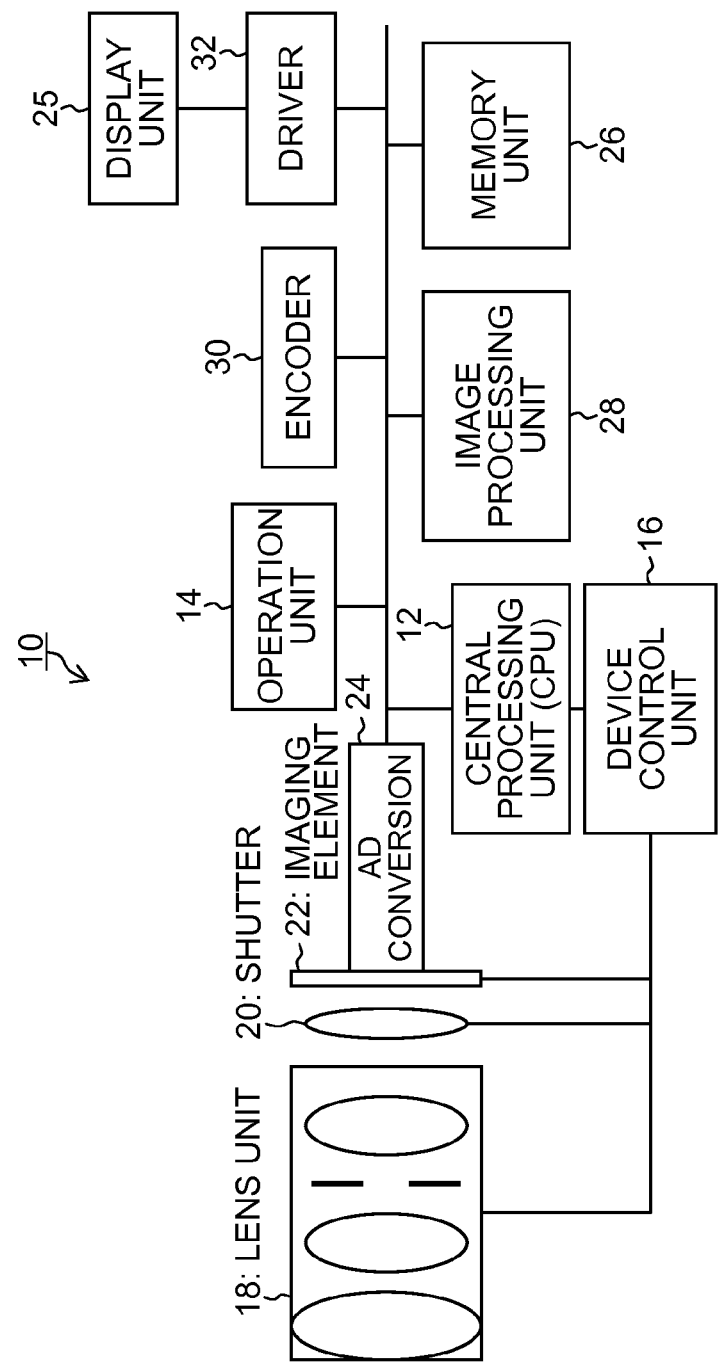
FIG. 1 is a block diagram illustrating an embodiment of an imaging device in accordance with the present invention.

FIG. 1 is a block diagram illustrating an embodiment of the imaging device in accordance with the present invention.

An imaging device 10 is a digital camera in which a photographed image is stored in an inside memory (memory unit 26) or an external storage media (not illustrated), and an operation of the whole device is centrally controlled by a central processing unit (CPU) 12.

The imaging device 10 includes an operation unit 14 provided with: a shutter button (shutter switch), a mode dial, a playback button, a MENU/OK key, a cross key, a zoom button, a BACK key, and the like. A signal from the operation unit 14 is inputted into the CPU 12, and the CPU 12 controls each circuit in the imaging device 10 based on the input signal, for example, controls a lens unit 18, a shutter 20, and an imaging element 22 functioning as an image acquisition unit through a device control unit 16 as well as performs photographing operation control, image processing control, image data storing and playback control, display control of a display unit 25, and the like.

The lens unit 18 includes a focus lens, a zoom lens, a diaphragm, and the like. Luminous flux passed through the lens unit 18 and the shutter 20 forms an image on a receiving surface of the imaging element 22.

The imaging element 22 is a color image sensor of a CMOS (Complementary Metal-Oxide Semiconductor) type, a XY-address type, or a CCD (Charge Coupled Device) type. On the receiving surface of the imaging element 22, a large number of light receiving elements (photodiodes) are arrayed to form a two-dimensional array. A subject image formed on the receiving surface of each of the photodiodes is converted into an amount of signal voltage (or electric charge) corresponding to an incident light amount of the subject image.

<Embodiments of the Imaging Element>

Figure 2:
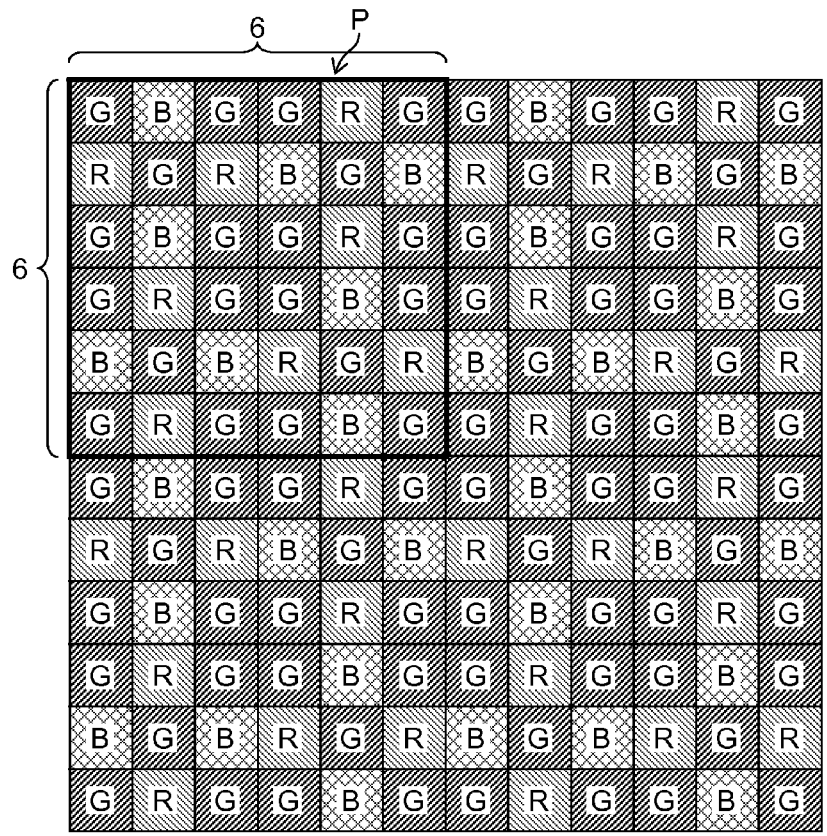
FIG. 2 illustrates a new mosaic color filter array arranged on an imaging element.

FIG. 2 illustrates an embodiment of the imaging element 22 above, especially illustrates a new color filter array arranged on the receiving surface of the imaging element 22.

The color filter array of the imaging element 22 includes a basic array pattern P (a pattern surrounded by thick lines) composed of a square array pattern corresponding to m×N (6×6) pixels, the basic array pattern P being repeatedly arranged in the horizontal and vertical directions. That is, in the color filter array, a filter (an R-filter, a G-filter, or a B-filter) of each of colors of red (R), green (G), and blue (B) is arranged in a predetermined cycle. As above, since the R-filter, the G-filter, and the B-filter are arranged in a predetermined cycle, it is possible to perform image processing or the like of RAW data (mosaic image) of RGB read out from the imaging element 22 in accordance with the repeated pattern.

In the color filter array illustrated in FIG. 2, one or more of the G-filters corresponding to a color most contributing to acquisition of a luminance signal (G color in the embodiment) are arranged in each of lines in horizontal, vertical, oblique upper right (NE), and oblique upper left (NW) directions.

The NE represents the oblique upper right direction, and the NW represents the oblique lower right direction. In a square pixel array, for example, each of the oblique upper right direction and the oblique lower right direction is inclined 45° with respect to the horizontal direction. In a rectangle pixel array, the NE and NW is a diagonal direction of the rectangle, therefore, an angle of the directions with respect to the horizontal direction may vary depending on a length of each of a long side and a short side.

The G-filter corresponding to a brightness type pixel is arranged in each of lines in horizontal, vertical, and oblique (NE and NW) directions in the color filter array, so that it is possible to improve reproducibility of synchronization processing in a high frequency region regardless of a direction to be the high frequency.

In the color filter array illustrated in FIG. 2, one or more of each of the R-filter and the B-Filter, corresponding to two or more colors other than the G color above (R and B colors in the embodiment), are arranged in each of lines in the horizontal and vertical directions in the basic array pattern.

The R-filter and B-filter are arranged in each of lines in the horizontal and vertical directions in the color filter array, so that it is possible to reduce occurrence of false color (color moire). Accordingly, an optical low-pass filter for reducing (preventing) occurrence of a false color may be eliminated. Even if an optical low-pass filter is applied, it is possible to apply a filter with a low function of removing a high frequency component to prevent occurrence of a false color, thereby enabling resolution not to be decreased.

In addition, in the basic array pattern P in the color filter array illustrated in FIG. 2, a pixel number of R-pixels, G-pixels, and B-pixels, corresponding to the R-filter, the G-filter, and the B-filter, in the basic array pattern, is 8 pixels, 20 pixels, and 8 pixels, respectively, that is, a ratio of each of the pixel numbers of RGB pixels is 2:5:2, so that a ratio of the pixel number of the G-pixels most contributing to acquisition of a luminance signal is larger than a ratio of each of the pixel numbers of the R-pixels and the B-pixels of another color.

As described above, the ratio of the pixel number of the G-pixels and the ratio of the pixel number of the R- and B-pixels are different, especially the ratio of the pixel number of the G-pixels most contributing to acquisition of a luminance signal is made larger than the ratios of the pixel numbers of the R- and B-pixels. As a result, it is possible to prevent aliasing when synchronization processing is performed as well as to achieve excellent reproducibility in a high frequency.

Figure 3:
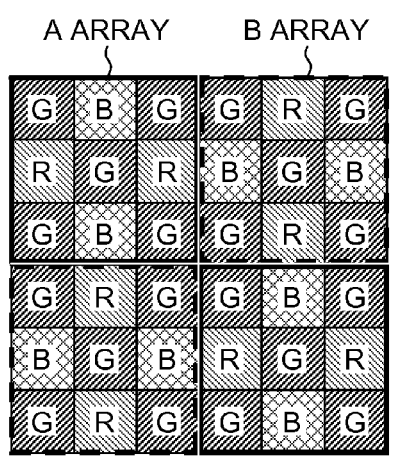
FIG. 3 illustrates a state in which a basic array pattern illustrated in FIG. 2 is divided into four divisions of 3×3 pixels.

FIG. 3 illustrates a state in which the basic array pattern P illustrated in FIG. 2 is divided into four divisions of 3×3 pixels.

As illustrated in FIG. 3, it can be perceived that the basic array pattern P is an array in which an A-array of 3×3 pixels surrounded by solid lines and a B-array of 3×3 pixels surrounded by broken lines are alternately arranged in the horizontal and vertical directions.

Each of the A-array and the B-array is provided with G-filters that are arranged at four corners and the center thereof, and that are aligned on both diagonals. In the A-array, the R-filters are arranged in the horizontal direction across the G-filter at the center, and the B-filters are arranged in the vertical direction across the G-filter at the center. On the other hand, in the B-array, the B-filters are arranged in the horizontal direction across the G-filter at the center, and the R-filters are arranged in the vertical direction across the G-filter at the center. Thus, the A-array and the B-array have position relations between the R-filter and the B-filter, which are opposite to each other, however, have the same array other than the R-filter and the B-filter.

The G-filters at the four corners of the A-array and the B-array form a square array pattern of the G-filters corresponding to 2×2 pixels by alternately arranging the A-array and the B-array in the horizontal and vertical directions.

Signal charges accumulated in the imaging element 22 with the constitution above are read out based on a read-out signal supplied from the device control unit 16 as voltage signals corresponding to the signal charges. The voltage signals read out from the imaging element 22 are supplied to an A/D converter 24, and then are sequentially converted into R, G, and B digital signals corresponding to the color filter array to be temporarily stored in the memory unit 26.

The memory unit 26 includes an SDRAM (Synchronous Dynamic Random Access Memory) serving as a volatile memory, an EEPROM (Electrically Erasable Programmable Read-Only Memory; storage unit) serving as a rewritable nonvolatile memory, and the like. The SDRAM is used as a work area when the CPU 12 executes a program, and as a storage area in which photographed and acquired digital image signals are temporarily stored. On the other hand, the EEPROM stores a camera control program including an image processing program, defect information on a pixel of the imaging element 22, and various parameters, tables, and the like to be used for image processing including mixed color correction, and the like.

The image processing unit 28 applies predetermined signal processing, such as mixed color correction, white balance correction, gamma correction processing, synchronization processing (demosaic processing), and RGB/YC conversion, with respect to a digital image signal temporarily stored in the memory unit 26. Here, the synchronization processing is processing in which all color information for each pixel from a mosaic image corresponding to a color filter array of a single plate type color imaging element is calculated, and the synchronization processing is also called as color interpolation processing or demosaicing processing. In a case of an imaging element composed of color filters of three colors of RGB, for example, the synchronization processing is processing of calculating color information on all RGB colors for each pixel from a mosaic image composed of RGB colors. Details of the image processing device (image processing unit 28) in accordance with the present invention will be described later.

Image data processed by the image processing unit 28 is encoded to image display data by an encoder 30, and is outputted to the display unit 25 provided on a back face of the camera through a driver 32, whereby the subject image is continuously displayed in a display screen of the display unit 25.

When the shutter button of the operation unit 14 is pressed to a first level (half press), the CPU 12 controls an AF (Automatic Focus) operation and an AE (Automatic Exposure Adjustment) operation so that the operations start to move the focus lens of the lens unit 18 in an optical axis direction through the device control unit 16 to allow the focus lens to reach an in-focus position.

When the shutter button is pressed halfway, the CPU 12 calculates brightness (photographing Ev value) of a subject based on image data outputted from the A/D converter 24 to determine exposure conditions (F value and shutter speed) in accordance with the photographing Ev value.

When the shutter button is pressed to a second level (full press) after the AE operation and the AF operation are finished, actual photographing is performed by controlling the diaphragm, the shutter 20, and an electric charge accumulate time in the imaging element 22 under the exposure condition determined. Image data on a mosaic image composed of RGB (an image corresponding to the color filter array illustrated in FIG. 2), which is read out from the imaging element 22 at the time of the actual photographing and then is converted for A/D conversion by the A/D converter 24, is temporarily stored in the memory unit 26.

The image data temporarily stored in the memory unit 26 is appropriately read out by the image processing unit 28, and then the predetermined signal processing including the mixed color correction, the white balance correction, the gamma correction, the synchronization processing (color interpolation processing), the RGB/YC conversion, and the like, is applied to the image data. The image data (YC data) to which the RGB/YC conversion is applied is compressed in accordance with a predetermined compression format (a JPEG (Joint Photographic Experts Group) method, for example). The compressed image data is stored in the inside memory and the external memory in the form of a predetermined image file (an Exif (Exchangeable image file format) file, for example).

[Image Processing]

Figure 4:
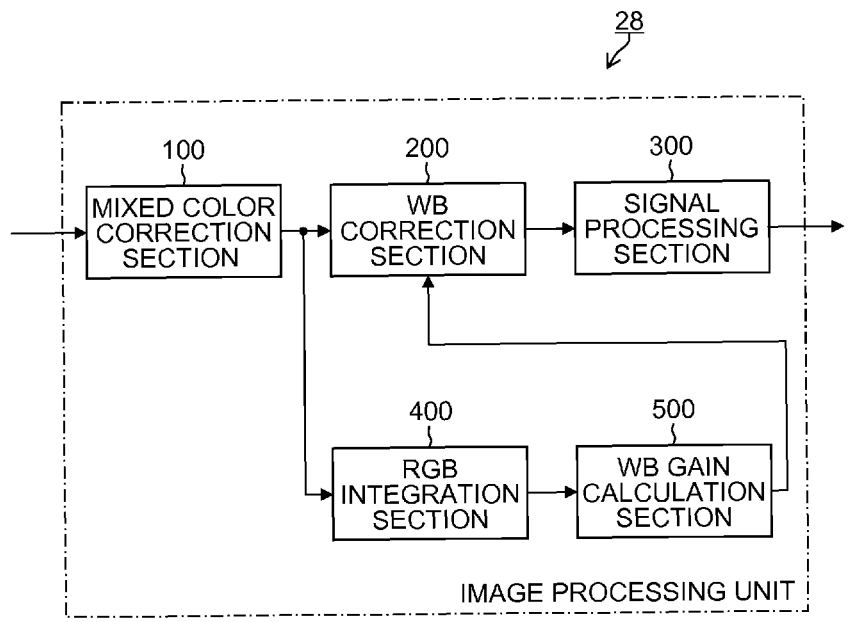
FIG. 4 is a main section block diagram illustrating an inside configuration of an image processing unit illustrated in FIG. 1.

FIG. 4 is a main section block diagram illustrating an inside configuration of the image processing unit 28 illustrated in FIG. 1.

As illustrated in FIG. 4, the image processing unit 28 includes: a mixed color correction section (mixed color correction unit) 100; a white balance (WB) correction section (white balance correction unit) 200; a signal processing section 300 performing signal processing, such as the gamma correction, the synchronization processing, the RGB/YC conversion; an RGB integration section 400; and a white balance (WB) gain calculation section (white balance gain calculation unit) 500.

As described above, RAW data (mosaic image) in accordance with the color filter array outputted from the imaging element 22 at the time of photographing is temporarily stored in the memory unit 26. The image processing unit 28 acquires the mosaic image (RGB color signals) from the memory unit 26.

The acquired RGB color signals are supplied to the mixed color correction section 100 in a point sequence. The mixed color correction section 100 eliminates a mixed color component from peripheral pixels included in color signals of an object pixel for mixed color correction received in a point sequence. Details of the mixed color correction section 100 will be described later.

A color signal of each of pixels in the mosaic image, in which a mixed color component is eliminated by the mixed color correction section 100, is supplied to a WB correction section 200 as well as to an RGB integration section 400.

The RGB integration section 400 calculates an integration average value of each of RGB color signals for each of divisions of 8×8 or 16×16 into which one screen is divided to calculate color information composed of ratios (R/G and B/G) of the integration average value for each RGB. In a case where one screen is divided into 64 divisions of 8×8, for example, 64 pieces of color information (R/G and B/G) are calculated.

The WB gain calculation section 500 calculates WB gains based on the color information (R/G and B/G) for each of the divisions received from the RGB integration section 400. In particular, a barycenter of distribution of 64 pieces of color information for each of the divisions in a color space of R/G and B/G coordinate axes is calculated, and a color temperature of ambient light is estimated from color information indicated by the barycenter. In addition, instead of the color temperature, it is acceptable to seek a light source type having the color information indicated by the barycenter, such as blue sky, shade, sunshine, fluorescent light (daylight color, day white color, white color, and warm white color), tungsten, and low tungsten, to estimate a light source type at the time of photographing (refer to Japanese Patent Application Laid-Open No. 2007-053499). Further, a color temperature may be estimated from the estimated light source type.

In the WB gain calculation section 500, a WB gain for each RGB or for each RB is prepared in advance to perform proper white balance correction in accordance with a color temperature of ambient light or a light source type. The WB gain calculation section 500 reads out corresponding WB gains for each RGB or for each RB based on the estimated color temperature of the ambient light or type of light source, and outputs the read-out WB gains to the WB correction section 200.

The WB correction section 200 performs white balance correction by multiplying each of color signals of R, G, and B received from the mixed color correction section 100 by a WB gain for each color, received from the WB gain calculation section 500.

The color signals of R, G, and B outputted from the WB correction section 200 is supplied to the signal processing section 300, and then the signal processing is performed, such as the gamma correction, the synchronization processing for converting the color signals of R, G, and B into a synchronous system by interpolating spatial deviation of the color signals of R, G, and B in accordance with the color filter array of the imaging element 22, the RGB/YC conversion for converting the synchronized color signals of R, G, and B into a luminance signal Y, and color difference signals Cr and Cb. The signal processing section 300 outputs the luminance signal Y, and the color difference signals Cr and Cb, to which the signal processing is applied.

Luminance data Y, and color difference data Cr and Cb outputted form the image processing unit 28 are compressed, and then stored in the inside memory and the external memory.

<Mixed Color Correction>

Figure 5:
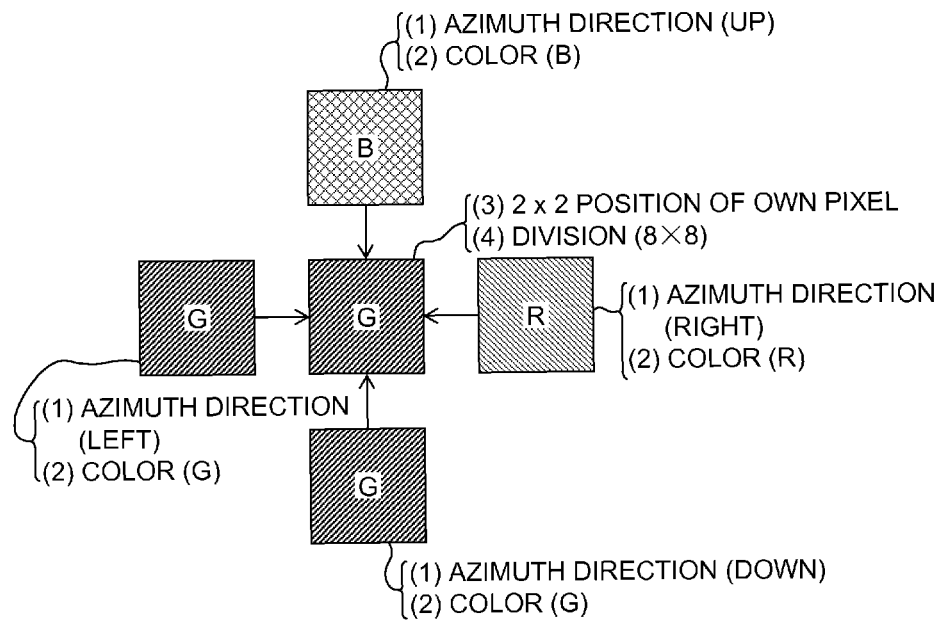
FIG. 5 is a diagram used to explain mixed color correction.

FIG. 5 illustrates a G-pixel (object pixel for mixed color correction) corresponding to an upper right G filter in four G filters of 2×2 in the color filter array illustrated in FIGS. 2 and 3, and peripheral pixels adjacent to the object pixel (own pixel) up and down, and right and left (an upper pixel (B-pixel), a lower pixel (G-pixel), a left pixel (G-pixel), and a right pixel (R-pixel)).

In a case of the object pixel illustrated in FIG. 5, colors of adjacency pixels in each of azimuth directions of up and down, and right and left, with respect to the object pixel, are B, G, G, and R, respectively.

As illustrated in FIG. 3, no matter which of 9 pixels of the A-array of 6×6 pixels and 9 pixels of the B-array is set as an object pixel, a combination of colors of 4 pixels adjacent to the object pixel up and down, and right and left, becomes different.

Influence of mixed colors caused from the peripheral pixels with respect to the own pixel depends on the azimuth directions (up and down, and right and left), and colors of the peripheral pixels (RGB).

Since each of colors of 4 peripheral pixels of the object pixel can be any one of three colors of RGB, there are 81 ($3^4$=81) combinations (repeated permutation) of the colors of the 4 peripheral pixels. In the color filter array of the embodiment, there are 18 combinations of 4 peripheral pixels corresponding to 18 pixels of the A-array and the B-array.

If a pixel size of a basic array pattern is increased to allow degrees of freedom of an array of pixels of three colors of RGB to increase, the number of combinations of color arrangement of adjacent peripheral pixels is increased. In addition, if there is a pixel of emerald, or yellow other than the three colors of RGB, combinations of color arrangement increase more.

In a case where color mix ratios are stored for each of combinations of colors of peripheral pixels by allowing respective color mix ratios of four peripheral pixels to serve as one set, a data amount of the color mix ratios becomes large. Considering peripheral pixels of oblique directions (upper left, upper right, lower left, and lower right) as well as four directions of up and down, and right and left, the number of combinations of color arrangement further increases to increase the data amount of color mix ratios.

Figure 6:
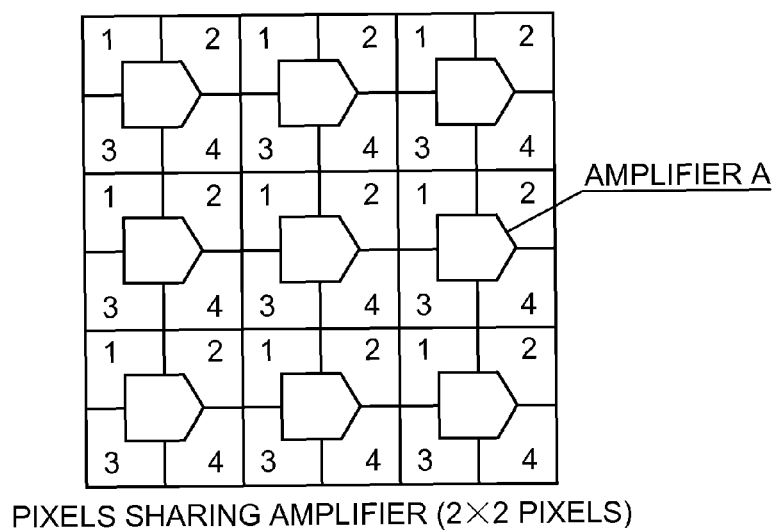
FIG. 6 illustrates an example of an imaging element in which 4 pixels of 2×2 share one amplifier.

The imaging element 22 of the embodiment is an imaging element of a CMOS type. An amplifier A shared by pixels is embedded in an undercoat of the CMOS, and K×L (2×2) pixels share one amplifier A, as illustrated in FIG. 6. The element structure of the imaging element 22 causes a difference in an output level of a pixel (an own pixel) depending on the positions 1 to 4 (upper left, upper right, lower left, and lower right, positions with respect to the amplifier A) with respect to the amplifier A.

The memory unit 26 stores the correction table illustrated in FIG. 7. In the correction table, a first parameter $P_1$ serving as four azimuth directions (up and down, and right and left) of peripheral pixels with respect to an object pixel (own pixel), a second parameter $P_2$ serving as three colors (RGB) of the peripheral pixels, and a third parameter $P_3$ serving as a position (positions 1 to 4 in FIG. 6) of an own pixel of 2×2 pixels sharing the amplifier A, there is stored a total of 48 color mix ratios of $A_1$ to $A_{12}$, $B_1$ to $B_{12}$, $C_1$ to $C_{12}$, and $D_1$ to $D_{12}$, corresponding to combinations of the parameters P1 to P3 by being associated with the parameters $P_1$ to $P_3$. When the correction table is stored in the memory unit 26, it is preferable to determine color mix ratios corresponding to the combinations of the parameters above in advance at the time of an inspection before shipping products, and store the color mix ratios for each of products.

Figure 8:
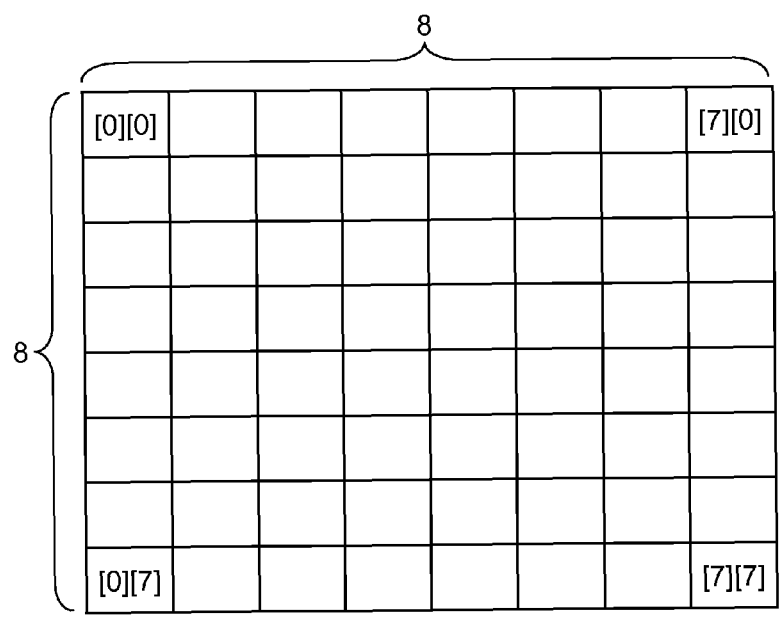
FIG. 8 illustrates divisions of 8×8 in a mosaic image.

An incident angle of subject light with respect to each of pixels of the imaging element 22 at a central portion and at a peripheral portion of the mosaic image are different, so that a color mix ratio of each of the portions is different. Thus, it is configured to divide the whole region of the mosaic image into 8×8 divisions, for example, as illustrated in FIG. 8, and store the correction table illustrated in FIG. 7 in the memory unit 26 for each of the divisions [0][0] to [7][7]. Hereinafter, a parameter specifying any one of 64(=8×8) divisions is referred to as a fourth parameter $P_4$.

Figure 9:
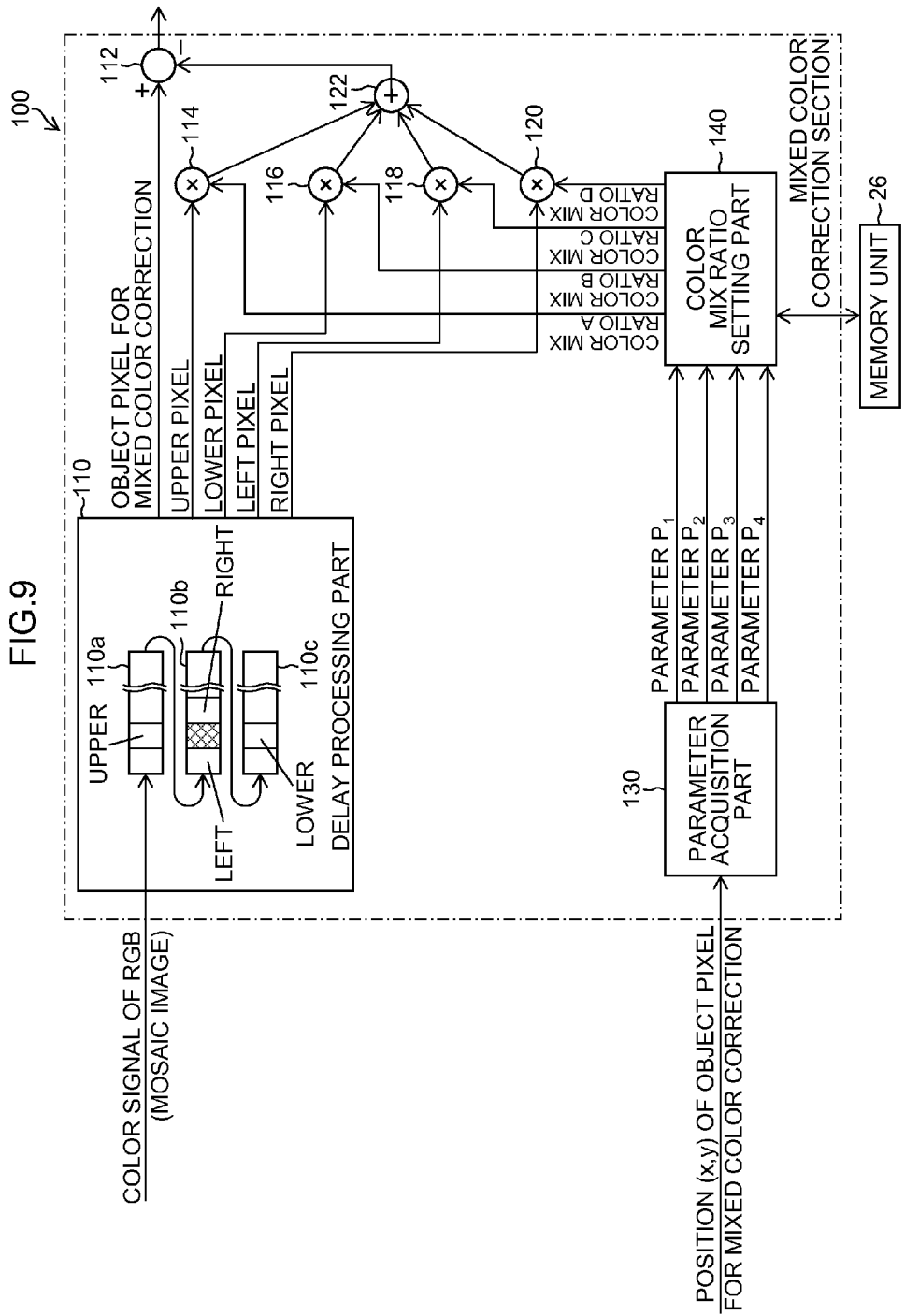
FIG. 9 is a block diagram illustrating an embodiment of an inside configuration of a mixed color correction section illustrated in FIG. 4.

FIG. 9 is a block diagram illustrating an embodiment of an inside configuration of the mixed color correction section 100 illustrated in FIG. 4.

The mixed color correction section 100 includes a delay processing part 110, a subtracter 112, multipliers 114 to 120, an adder 122, a parameter acquisition part (parameter acquisition unit) 130, and a color mix ratio setting part 140.

In FIG. 9, a mosaic image (color signals of RGB) acquired through the imaging element 22 is supplied to the delay processing part 110 in a point sequence. The delay processing part 110 includes line memories 110*a* to 110*c* of a line 1H (horizontal line). The color signals of RGB inputted in a point sequence are sequentially shifted in the line memories 110*a* to 110*c* at an interval of processing one pixel. If a color signal at a position indicated with oblique lines in the line memory 110*b* serves as a color signal of an object pixel for mixed color correction, color signals at the same positions in the line memories 110*a* and 110*c* serve as color signals of an upper pixel and a lower pixel, respectively, and color signals at right and left positions of the position indicated with oblique lines in the line memory 110*b* serve as color signals of a left pixel and a right pixel, respectively.

As described above, the delay processing part 110 appropriately delays color signals of RGB inputted in a point sequence, and simultaneously outputs an object pixel for mixed color correction and peripheral pixels of the up and down, and the right and left of the object pixel (an upper pixel, a lower pixel, a left pixel, and a right pixel). The color signal of the object pixel outputted from the delay processing part 110 is supplied to the subtracter 112, and color signals of the upper pixel, lower pixel, left pixel, and right pixel are supplied to the multipliers 114 to 120, respectively.

The parameter acquisition part 130 receives information showing a position (x,y) of the object pixel in the mosaic image outputted from the delay processing part 110. The parameter acquisition part 130 acquires first to fourth parameters $P_1$ to $P_4$ based on the information showing the position (x,y) of the object pixel. It is possible to acquire the information showing the position (x,y) of the object pixel from the CPU 12 instructing signal processing for each of pixels in a mosaic image or the image processing unit 28.

Once the position (x,y) of the object pixel in the mosaic image is specified, it is possible to determine the third parameter $P_3$ indicating the position (the positions 1 to 4 in FIG. 6) of the object pixel (own pixel), and the fourth parameter $P_4$ indicating a division to which the own pixel belongs (refer to FIG. 8). In addition, once the position (x,y) of the object pixel in the mosaic image is specified, it is possible to determine colors of the peripheral pixels (the upper pixel, lower pixel, left pixel, and right pixel) of the object pixel, that is, it is possible to determine the second parameter $P_2$ indicating colors of the peripheral pixels, corresponding to the first parameter $P_1$ indicating azimuth directions of the peripheral pixels. The parameter acquisition part 130 determines the first to fourth parameters $P_1$ to $P_4$ based on the information on the position (x,y) of the object pixel in the mosaic image as described above, and output the parameters to the color mix ratio setting part 140. At the time, four sets of the first parameter $P_1$ and the second parameter $P_2$ are outputted by corresponding to the azimuth directions of the peripheral pixels.

The color mix ratio setting part 140 reads out corresponding four color mix ratios A to D from the memory unit 26 based on the first to fourth parameters $P_1$ to $P_4$ received from the parameter acquisition part 130, and supplies the color mix ratios A to D to the multipliers 114 to 120, respectively, together with other inputs, that is, the color mix ratio setting part 140 selects a correction table corresponding to the division to which the object pixel belongs based on the fourth parameter $P_4$, and reads out the color mix ratios A to D (refer to FIG. 7) of the respective azimuth directions of the peripheral pixels from the selected correction table based on the first to third parameters $P_1$ to $P_3$.

The multipliers 114 to 120 multiply the received color signals of the upper pixel, lower pixel, left pixel, and right pixel, and the received color mix ratios A to D together, respectively, to output the multiplication values to the adder 122. The adder 122 adds the received four multiplication values to supply an added value to the subtracter 112 together with other inputs. The added value corresponds to a mixed color component included in the color signal of the object pixel for mixed color correction.

Since the color signal of the object pixel for mixed color correction is added to another input received by the subtracter 112, the subtracter 112 subtracts the added value (mixed color component) received from the adder 122 from the color signal of the object pixel to output the color signal of the object pixel, from which the mixed color component is eliminated (mixed color correction is performed).

The calculation above performed by the subtracter 112, the multipliers 114 to 120, and the adder 122, can be expressed by the following expression.

Color signal after correction=color signal before correction−(upper pixel×color mix ratio $A$+lower pixel×color mix ratio $B$+left pixel×color mix ratio $C$+right pixel×color mix ratio $D$) [Expression 1]

As described above, the color signal to which mixed color correction is applied by the mixed color correction section 100 is outputted to subsequent stages of the WB correction section 200 and the RGB integration section 400 (refer to FIG. 4).

<Image Processing Method>

Figure 10:
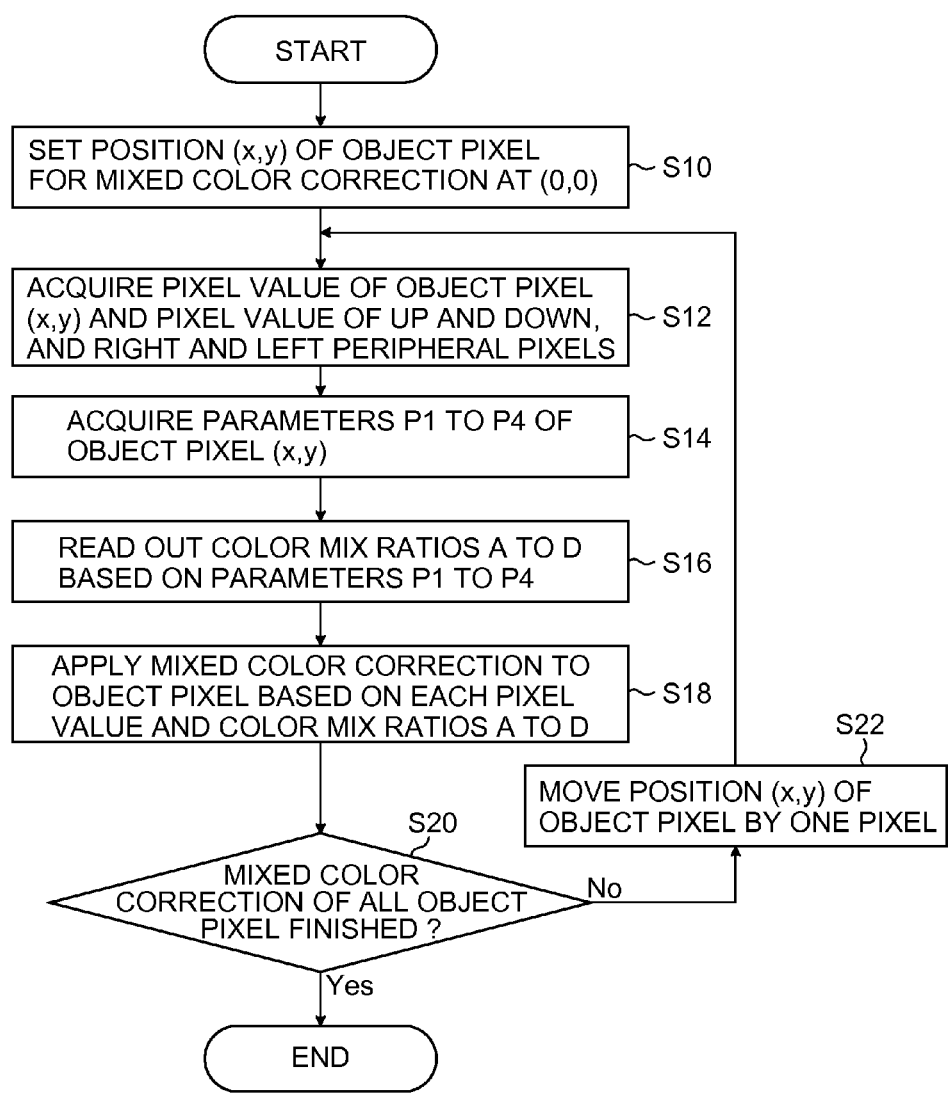
FIG. 10 is a flow chart illustrating an embodiment of an image processing method in accordance with the present invention.

FIG. 10 is a flow chart illustrating an embodiment of the image processing method in accordance with the present invention.

In FIG. 10, the mixed color correction section 100 first sets a position (x,y) of the object pixel for mixed color correction before starting mixed color correction as an initial value (0,0) (step S10).

Subsequently, a color signal (pixel value) of the object pixel (x,y), and color signals (pixel value) of peripheral pixels up and down, and right and left the object pixel (x,y) are acquired (step S12).

The parameter acquisition part 130 acquires first and fourth parameters $P_1$ to $P_4$ based on the position (x,y) of the object pixel as described above (step S14).

The color mix ratio setting part 140 reads out corresponding color mix ratios A to D from the memory unit 26 based on the first to fourth parameters $P_1$ to $P_4$ acquired by the parameter acquisition part 130 (step S16).

Next, calculation processing expressed by Expression 1 is performed based on the pixel values of the object pixel and the peripheral pixels acquired in the step S12, and the color mix ratios A to D read out in the step S16, to perform mixed color correction for eliminating a mixed color component from the pixel value of the object pixel (step S18).

Subsequently, it is determined whether mixed color correction of all object pixels is finished (step S20), if not finished (in a case of "No"), the processing is transferred to step S22.

In the step S22, the position (x,y) of the object pixel is moved by one pixel, and when the position (x,y) of the object pixel reaches a left end in the horizontal direction, the position (x,y) of the object pixel is returned to a right end in the horizontal direction as well as is moved by one pixel in a vertical direction to transfer the processing to the step S14, thereby repeatedly performing processing from the step S12 to the step S20 above.

Meanwhile, in the step S20, if it is determined that mixed color correction of all object pixels is finished (in a case of "Yes"), the mixed color correction is finished.

[Others]

The present invention is not limited to the mosaic image composed of the color filter array illustrated in FIG. 2, but is applicable to mosaic images of a variety of color filter arrays. The present invention is also applicable to a mosaic image composed of only the A-array or the B-array illustrated in FIG. 3. A size N×M of the basic array pattern to which the present invention is applied is preferably 5×5 or more, and is more preferably 10×10 or less. In addition, the present invention is applicable to even a mosaic image having no basic array pattern, in which pixels of RGB are randomly arranged. In this case, the present invention is applicable without changing hardware of the mixed color correction.

Further, the third parameter $P_3$ indicating a position of the own pixel with respect to an amplifier is not required for a mosaic image acquired from an imaging element in which no amplifier shared by pixels is embedded. In a case where there is little difference in color mix ratios at a central portion and a peripheral portion in a mosaic image, it is unnecessary to have a correction table of color mix ratios for each division.

<Additional Embodiments of Color Filter Arrays>

In each of the embodiments described above, an example of green (G) serving as a first color, and red (R) and blue (B) serving as second colors is described, however, colors applicable to a color filter are not limited to the colors above. In addition, in each of the embodiments described above, color filters corresponding to colors satisfying conditions below are applicable.

<Condition of a First Filter (First Color)>

In each of the embodiments described above, a filter satisfying any one of conditions (1) to (4) described below is applicable instead of the G filters or by being replaced with a part of the G filters, for example.

[Condition (1)]

The condition (1) is defined that a contribution rate to obtain a luminance signal is 50% or more. The contribution rate of 50% is a value determined to discriminate the first color (G color, and the like) and the second color (R and B colors, and the like) in accordance with each of the embodiments described above so that a color with a contribution rate to obtain luminance data, the contribution rate being relatively higher than that of the R color, the B color, or the like, is included in the "first color".

For example, the G color has a contribution rate to obtain a luminance (Y) signal (luminance data), which is higher than that of the R color and the B color, that is, the contribution rates of the R color and the B color are lower than that of the G color. Specifically, the image processing unit 28 described above generates a luminance signal (Y signal) from an RGB pixel signal having color information on all RGB for each of pixels, according to an expression (1) below. The expression (1) below is general used to generate the Y signal in the color imaging element 22. In the expression (1), a contribution rate of the G color to a luminance signal becomes 60%, so that the G color has a contribution rate higher than contribution rates of the R color (contribution rate of 30%) and the B color (contribution rate of 10%). Thus, the G color most contributes to a luminance signal in the three primary colors.

$$Y=0.3R+0.6G+0.1B \quad \text{Expression (1)}$$

The contribution rate of the G color is 60% as illustrated in the expression (1) above, so that the G color satisfies the condition (1). It is also possible to obtain contribution rates of colors other than the G color by experiment or simulation. Accordingly, a filter having a color other than the G color, the color having a contribution rate of 50% or more, is applicable as a first filter in each of the embodiments above. In addition, a color having a contribution rate of less than 50% serves as the second color (the R color, the B color, and the like) in each of the embodiments above, so that a filter having the color serves as a second filter in each of the embodiments above.

[Condition (2)]

The condition (2) is defined that a peak of transmittance of a filter has a wavelength within a range of 480 nm or more and 570 nm or less. The transmittance of a filter is a value measured by a spectrophotometer, for example. The wavelength range is determined to discriminate the first color (G color and the like) and the second color (R and B colors and the like) in accordance with each of the embodiments above so that peaks of wavelengths of the R color, the B color, and the like, with a relatively lower contribution rate described before, are not included, but peaks of wavelengths of the G color and the like, with a relatively higher contribution rate, are included. Accordingly, a filter with a peak of transmittance has a wavelength within a range of 480 nm or more and 570 nm or less is applicable as the first filter. In addition, a filter with a peak of transmittance out of the range of a wavelength of 480 nm or more and 570 nm or less serves as the second filter (the R-filter and the B-filter) in accordance with each of the embodiments above.

[Condition (3)]

The condition (3) is defined that transmittance with a wavelength within a range of 500 nm or more and 560 nm or less is higher than transmittance of the second filter (the R-filter and the B-filter). Even in the condition (3), the transmittance of a filter is a value measured by a spectrophotometer, for example. The wavelength range of the condition (3) is also determined to discriminate the first color (G color and the like) and the second color (R and B colors and the like) in accordance with each of the embodiments above so that transmittance of a filter having a color with a contribution rate described before relatively higher than contribution rates of the R color, the B color, and the like, is higher than transmittance of the R-filter, the B-filter, and the like. Accordingly, a filter with transmittance relatively higher within the range of a wavelength of 500 nm or more and 560 nm or less is applicable as the first filter, and a filter with transmittance relatively lower is applicable as the second filter.

[Condition (4)]

The condition (4) is defined that a filter of two or more colors including a color (the G color in RGB, for example) most contributing to a luminance signal in the three primary colors, and a color different from the three primary colors, is used as the first filter. In this case, a filter corresponding to a color other than each of the colors of the first filter serves as the second filter.

<A Plurality of Types of the First Filter (G-Filter)>

Thus, the G-filter of the G color as the first filter is not limited to one type, but a plurality of types of the G-filter is applicable as the first filter, for example, that is, the G-filter of the color filter (basic array pattern) in accordance with each of the embodiments described above may be appropriately replaced with the first G-filter G1 or the second G-filter G2. The first G-filter G1 transmits G-light with a first wavelength band, and the second G-filter G2 transmits G-light with a second wavelength band having a high correlation with the first G-filter G1 (refer to FIG. 11).

The existing G-filter (the G-filter G of the first embodiment, for example) is applicable as the first G-filter G1. A filter having a high correlation with the first G-filter G1 is applicable as the second G-filter G2. In this case, it is desirable that a peak value of a spectral sensitivity curve of a light receiving element in which the second G-filter G2 is arranged has a wavelength within a range of 500 nm to 535 nm, for example (close to a peak value of a spectral sensitivity curve of a light receiving element in which the existing G-filter is arranged). In addition, the method described in Japanese Patent Application Laid-Open No. 2003-284084 is used as a method of determining color filters of four colors (R, G1, G2, and B), for example.

As described above, allowing a color imaging element to acquire an image by four colors to increase color information to be acquired enables the image to be expressed with more accurate color as compared with a case in which only three types of colors (RGB) are acquired, that is, it is possible to reproduce colors so that a different color viewed with eyes is expressed as a different color, and the same color viewed with eyes is expressed as the same color (to improve "color discrimination").

Since transmittance of the first and second G-filters G1 and G2 is basically the same as transmittance of the G-filter G of the first embodiment, a contribution rate to obtain a luminance signal is higher than 50%. Thus, the first and second G-filters G1 and G2 satisfy the condition (1) described before.

Figure 11:
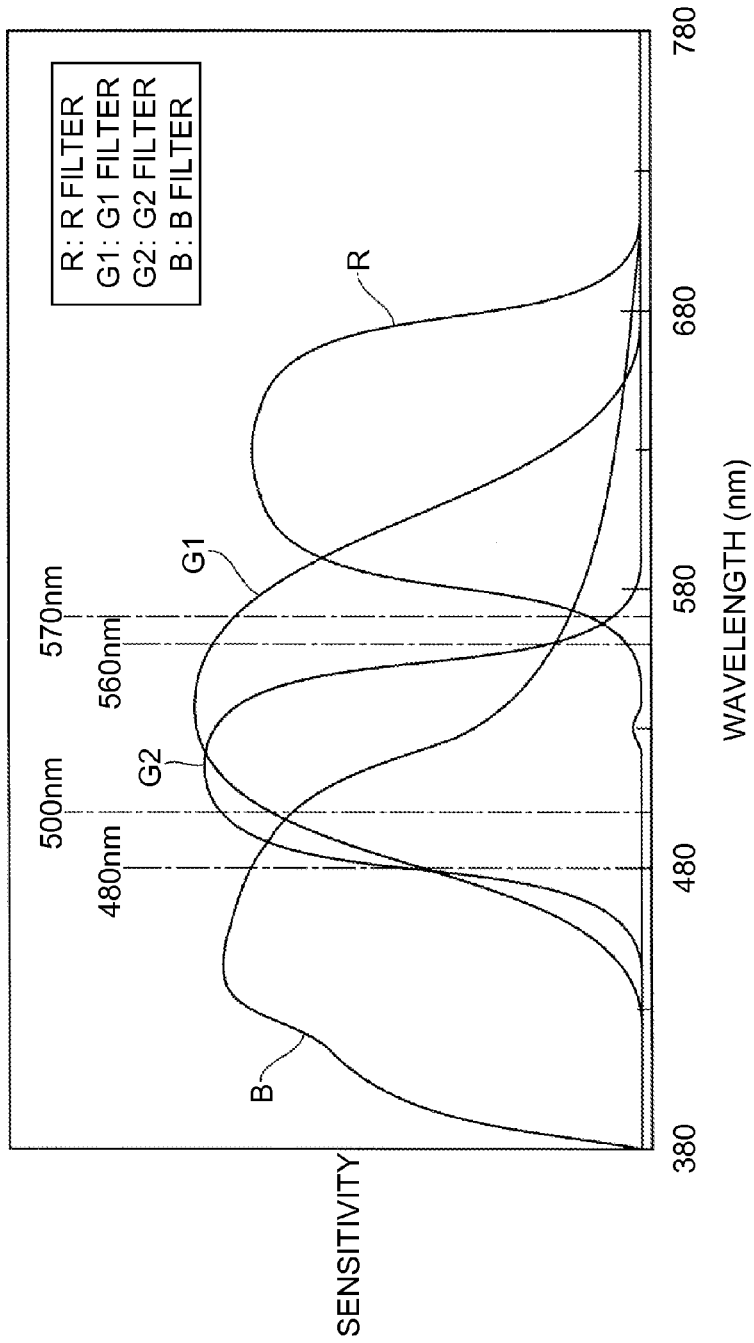
FIG. 11 is a graph illustrating spectral sensitivity characteristics of an imaging element including an R-filter (red filter), a G1-filter (first green filter), a G2-filter (second green filter), and a B-filter (blue filter)

In FIG. 11 illustrating spectral sensitivity characteristics of a color filter array (light receiving element), a peak transmittance of each of the G-filters G1 and G2 (a peak of sensitivity of each of the G-pixels) has a wavelength within a range of 480 nm or more and 570 nm or less. Transmittance of each of the G-filters G1 and G2 with a wavelength within a range of 500 nm or more and 560 nm or less becomes higher than transmittance of RB filters R and B. Thus, each of the G-filters G1 and G2 also satisfy the conditions (2) and (3) described before.

Arrangement and the number of each of the G-filters G1 and G2 may be appropriately changed. In addition, the number of types of the G-filter G may be increased to three or more.

<Transparent Filter (W-Filter)>

In the embodiment described above, although a color filter composed of color filters corresponding to RGB colors is mainly illustrated, a transparent filter W (a white color pixel) may serves as a part of the color filters. In particular, it is preferable to arrange the transparent filter W by being replaced with a part of the first filter (G-filter G). Replacing a part of the G-pixel with the white color pixel as above enables color reproducibility to be prevented from being deteriorated even if a pixel size is fined.

The transparent filter W has a transparent color (first color). The transparent filter W allows light corresponding to a wavelength region of visible light to be transmitted therethrough, and has transmittance of light of each of RGB colors, the transmittance being 50% or more, for example. Transmittance of the transparent filter W is to be higher than that of the G-filter G, so that a contribution rate to obtain a luminance signal becomes higher than that of the G color (60%), thereby satisfying the condition (1) described before.

Figure 12:
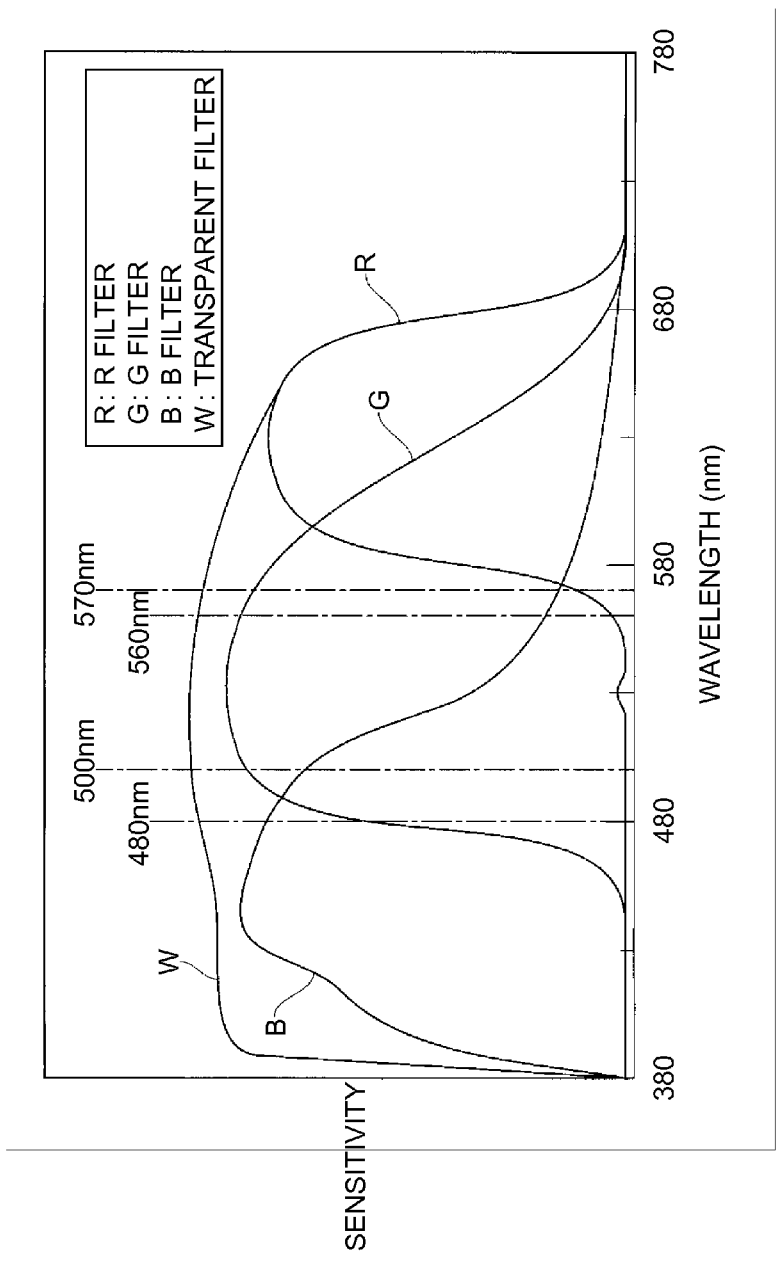
FIG. 12 is a graph illustrating spectral sensitivity characteristics of an imaging element including an R-filter, a G-filter, a B-filter and a W-filter (transparent filter)

In FIG. 12 illustrating spectral sensitivity characteristics of a color filter array (light receiving element), a peak transmittance of the transparent filter W (a peak of sensitivity of the white color pixel) has a wavelength within a range of 480 nm or more and 570 nm or less. In addition, transmittance of the transparent filter W with a wavelength within a range of 500 nm or more and 560 nm or less becomes higher than transmittance of RB filters R and B, whereby the transparent filter W satisfies conditions (2) and (3) described before. The G-filter G satisfies the conditions (1) to (3) described before as well as the transparent filter W.

As described above, since the transparent filter W satisfies the conditions (1) to (3) described before, the transparent filter W is applicable as the first filter in each of the embodiments above. In the color filter array, a part of the G-filter G corresponding to the G color most contributing a luminance signal in three primary colors of RGB is replaced with the transparent filter W, thereby also satisfying the condition (4) described before.

<Emerald Filter (E-Filter)>

In the embodiment described above, although a color filter composed of color filters corresponding to RGB colors is mainly illustrated, a part of the color filters may be replaced with another color filter, for example, an E-filter (emerald pixel) corresponding to emerald (E) color may be applicable. In particular, it is preferable to arrange an emerald filter (E-filter) by being replaced with a part of the first filter (G-filter G). It is possible to improve reproduction of high region components of luminance to reduce jaggedness and improve resolution feeling by using a color filter array of four colors, in which a part of the G-filter G is replaced with the E-filter as described above.

Figure 13:
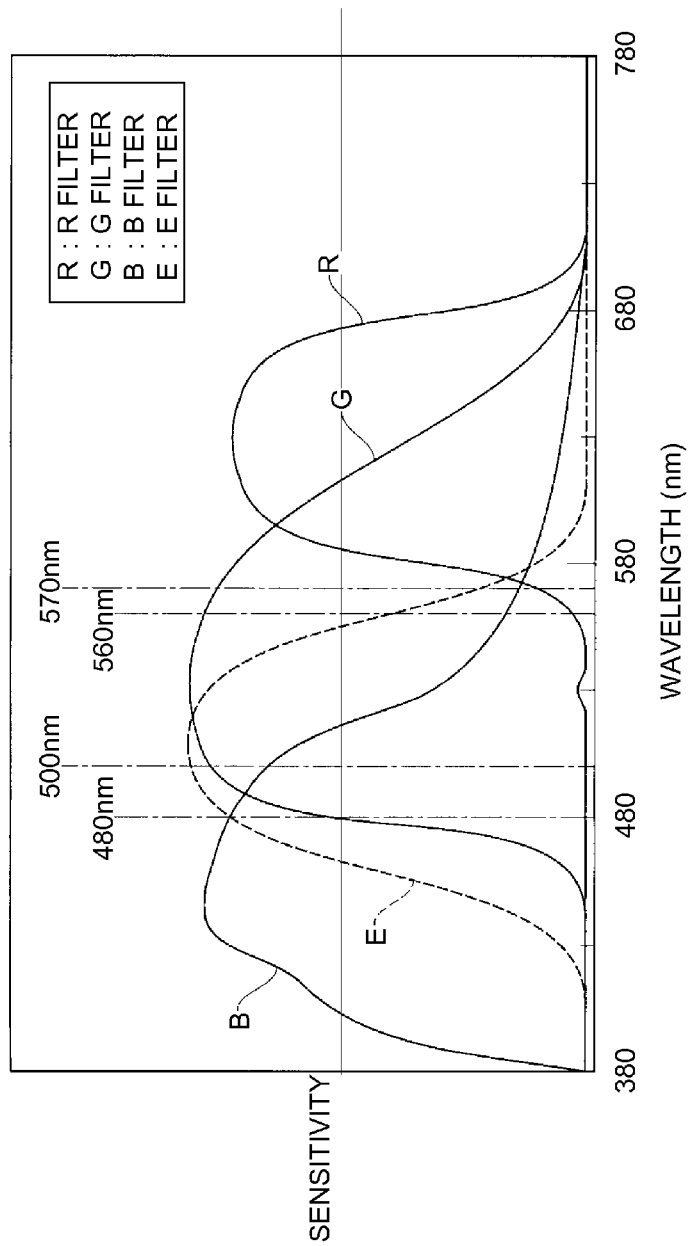
FIG. 13 is a graph illustrating spectral sensitivity characteristics of an imaging element including an R-filter, a G-filter, a B-filter and an E-filter (emerald filter).

In FIG. 13 illustrating spectral sensitivity characteristics of a color filter array (light receiving element), a peak transmittance of the emerald filter E (a peak of sensitivity of the E pixel) has a wavelength within a range of 480 nm or more and 570 nm or less. In addition, transmittance of the emerald filter E with a wavelength within a range of 500 nm or more and 560 nm or less becomes higher than transmittance of RB filters R and B, whereby the emerald filter E satisfies conditions (2) and (3) described before. In the color filter array, a part of the G-filter G corresponding to the G color most contributing a luminance signal in three primary colors of RGB is replaced with the emerald filter E, thereby also satisfying the condition (4) described before.

In the spectral characteristics illustrated in FIG. 13, the emerald filter E has a peak at a wavelength shorter than a wavelength of a peak of the G-filter G, but sometimes has a peak wavelength longer than a wavelength of a peak of the G-filter G (viewed as a color a little close to yellow color). As described above, it is possible to select an emerald filter E that satisfies each of conditions described above, so that it is also possible to select an emerald filter E that satisfies the condition (1), for example.

<Types of Other Colors>

In each of the embodiments described above, a color filter array composed of color filters of the primary colors RGB is described, however, the present invention is applicable to a color filter array composed of color filters of four colors composed of complementary colors of the primary colors RGB including C (cyan), M (magenta), and Y (yellow), and added G, for example. In this case, a color filter satisfying any one of the conditions (1) to (4) described above serves as the first filter in accordance with each of the embodiments above, and other color filters serve as the second filter.

<Honeycomb Arrangement>

Each of color filter arrays of each of the embodiments above includes a basic array pattern in which color filters of each color are arrayed in a horizontal direction (H) and a vertical direction (V) to form a two-dimensional array, the basic array pattern being repeatedly arrayed in the horizontal direction (H) and the vertical direction (V), however, the present invention is not limited to the color filter arrays above.

For example, the color filter may be composed of an array pattern formed by using a basic array pattern of so-called a honeycomb array formed by turning the basic array pattern of each of the embodiments above around an optical axis by 45°, the basic array pattern being repeatedly arrayed in the oblique direction (NE or NW).

In addition, the present invention is not limited to the embodiments described above, therefore, it is needless to say that a variety of modifications are possible within a range without departing from the spirit of the present invention.

What is claimed is:

1. An image processing device comprising:
an image acquisition unit configured to acquire a mosaic image including pixels of a plurality of colors;
a storage unit configured to store a color mix ratio caused from peripheral pixels adjacent to an object pixel for mixed color correction in the mosaic image, the storage unit storing the color mix ratio corresponding to a combination of a first parameter indicating azimuth directions of the peripheral pixels and a second parameter indicating colors of the peripheral pixels; and
a mixed color correction unit configured to eliminate, from a color signal of each of pixels in the mosaic image acquired by the image acquisition unit, mixed color components that are caused from the peripheral pixels, and are included in the color signal,
wherein the mixed color correction unit includes a parameter acquisition unit configured to acquire the first parameter and the second parameter of each of the peripheral pixels corresponding to any object pixel based on a position of the object pixel in the mosaic image, and reads out the corresponding color mix ratio from the storage unit based on the acquired first parameter and the acquired second parameter, and
wherein when the mixed color correction is applied to any object pixel, the mixed color correction unit acquires a color signal of the object pixel and color signals of peripheral pixels of the object pixel, reads out the corresponding color mix ratio from the storage unit based on azimuth directions and colors of the peripheral pixels, and eliminates mixed color components included in the object pixel based on the color signal of the object pixel for the mixed color correction and the color signals of the peripheral pixels adjacent to the object pixel, and the read-out color mix ratio of each of the peripheral pixels,
wherein the mosaic image is outputted from an imaging element having an element structure in which an amplifier is shared for each predetermined pixel group,
when a third parameter is positional information showing the position of the object pixel for the mixed color correction in the pixel group sharing the amplifier, the storage unit stores a color mix ratio corresponding to a combination of the first parameter, the second parameter, and the third parameter,
the parameter acquisition unit acquires the first parameter, the second parameter, and the third parameter for each of the peripheral pixels based on the position of any object pixel in the mosaic image, and
the mixed color correction unit reads out the corresponding color mix ratio from the storage unit for each of the peripheral pixels based on the acquired first parameter, the acquired second parameter, and the acquired third parameter.

2. An imaging device comprising:
an imaging unit including a photographic optical system, and an imaging element on which a subject image is formed through the photographic optical system; and
an image processing device comprising:
an image acquisition unit configured to acquire a mosaic image including pixels of a plurality of colors;
a storage unit configured to store a color mix ratio caused from peripheral pixels adjacent to an object pixel for mixed color correction in the mosaic image, the storage unit storing the color mix ratio corresponding to a combination of a first parameter indicating azimuth directions of the peripheral pixels and a second parameter indicating colors of the peripheral pixels; and
a mixed color correction unit configured to eliminate, from a color signal of each of pixels in the mosaic image acquired by the image acquisition unit, mixed color components that are caused from the peripheral pixels, and are included in the color signal,
wherein when the mixed color correction is applied to any object pixel, the mixed color correction unit acquires a color signal of the object pixel and color signals of peripheral pixels of the object pixel, reads out the corresponding color mix ratio from the storage unit based on azimuth directions and colors of the peripheral pixels, and eliminates mixed color components included in the object pixel based on the color signal of the object pixel for the mixed color correction and the color signals of the peripheral pixels adjacent to the object pixel, and the read-out color mix ratio of each of the peripheral pixels,
wherein the image acquisition unit acquires a mosaic image outputted from the imaging unit,
wherein on the imaging element, a color filter with a predetermined color filter array is arranged on a plurality of pixels composed of photoelectric conversion elements arranged in a horizontal direction and a vertical direction,
the color filter array includes a predetermined basic array pattern in which there are arranged a first filter corresponding to a first color consisting of one or more colors, and a second filter corresponding to a second color consisting of two or more colors, the second color having a contribution rate for acquiring a luminance signal, the contribution rate being lower than that of the first color, and in which the basic array pattern is repeatedly arranged in the horizontal direction and the vertical direction,
the basic array pattern is an array pattern corresponding to M×N ("M" and "N" are integers of 2 or more, at least one of the integers is 3 or more) pixels,
wherein the first color is green (G), and the second colors are red (R) and blue (B),
the predetermined basic array pattern is a square array pattern corresponding to 6×6 pixels, and
wherein the filter array includes: a first array corresponding to 3×3 pixels, the first array including G-filters arranged at a center and four corners thereof, B-filters arranged up and down across a G-filter arranged at the center, and R-filters arranged right and left across the G-filter arranged at the center; and a second array corresponding to 3×3 pixels, the second array including G-filters arranged at a center and four corners thereof, R-filters arranged up and down across a G-filter arranged at the center, and B-filters arranged right and left across the G-filter arranged at the center; the first array and the second array being alternately arranged in the horizontal direction and the vertical direction.

3. The imaging device according to claim 2,
wherein the imaging element has an element structure in which an amplifier is shared for each predetermined pixel group, and the predetermined pixel group has a size of K×L (K≤M, L≤N, K and L are natural numbers) pixels.

* * * * *